Figure 1:
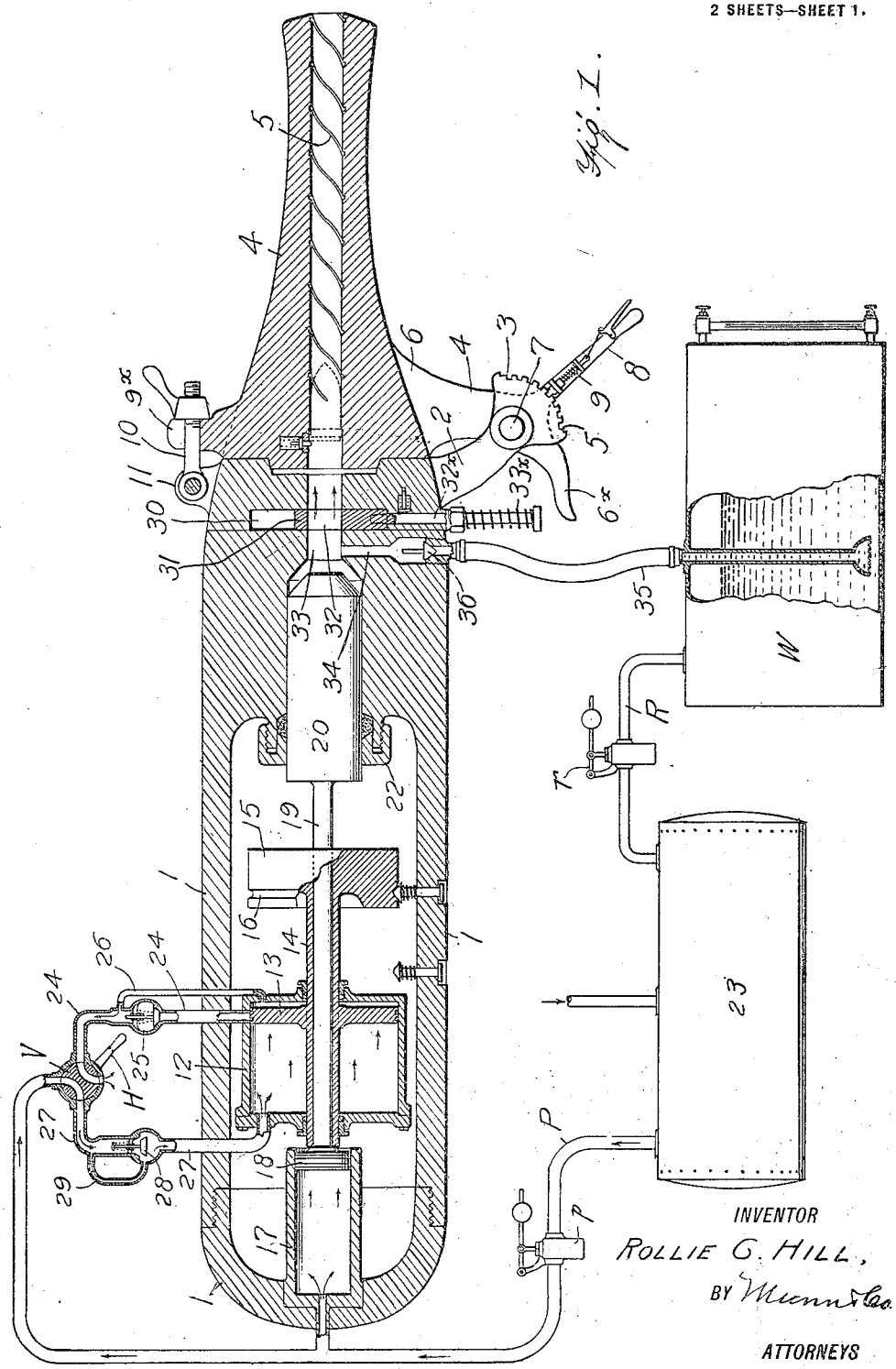

R. C. HILL.
PNEUMATIC HYDRAULIC GUN.
APPLICATION FILED DEC. 31, 1915.

1,183,644.

Patented May 16, 1916.
2 SHEETS—SHEET 1.

INVENTOR
ROLLIE G. HILL,
BY Munn & Co.
ATTORNEYS

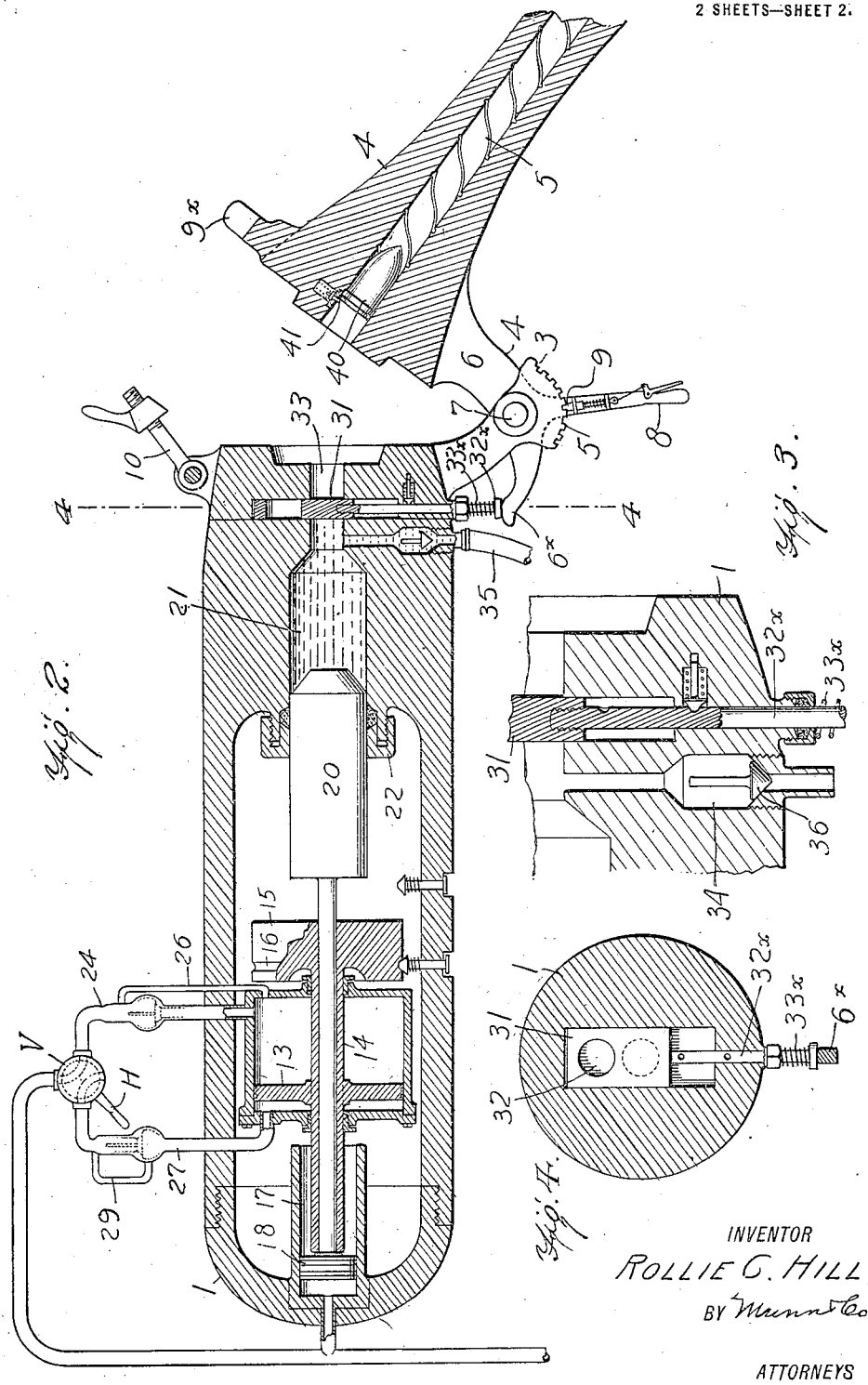

UNITED STATES PATENT OFFICE.

ROLLIE CALVIN HILL, OF MEMPHIS, TENNESSEE.

PNEUMATIC-HYDRAULIC GUN.

1,183,644.  Specification of Letters Patent.  Patented May 16, 1916.

Application filed December 31, 1915. Serial No. 69,645.

*To all whom it may concern:*

Be it known that I, ROLLIE C. HILL, a citizen of the United States, and a resident of Memphis, in the county of Shelby and State of Tennessee, have invented a certain new and useful Improvement in Pneumatic-Hydraulic Guns, of which the following is a specification.

My invention relates to improvements in pneumatic-hydraulic guns, and it consists in the combinations, constructions, and arrangements herein described and claimed.

An object of my invention is to provide a gun which may be fired by pneumatic means working in connection with a source of liquid supply.

A further object of my invention is to provide a pneumatic-hydraulic gun which may be unbreeched without loss of liquid.

Other objects and advantages will appear in the following specification, and the novel features of the invention will be particularly pointed out in the appended claims.

My invention is illustrated in the accompanying drawings forming part of this specification, in which:

Figure 1 is a section through the device. Fig. 2 is a section through the device showing the gun unbreeched. Fig. 3 is an enlarged detail sectional view of a portion of the device. Fig. 4 is a section on the line 4—4 of Fig. 2.

In carrying out my invention I provide a main casing 1 which is provided at one end with an arm 2 having a locking segment 3. A barrel 4 is provided, this barrel being rifled as shown at 5 and being provided with an extension or arm 6 which is pivoted to the arm 2 by means of a pivot pin 7. Secured to the arm 6 is a handle 8 provided with a locking device 9 arranged to engage the locking segment 3. The arm 6 is provided with a finger $6^x$ whose purpose will be explained hereinafter. On the opposite side of the barrel are lugs or ears $9^x$ arranged to engage a pivoted locking member 10 carried by ears or lugs 11 on the casing 1.

Supported in any suitable manner within the casing 1 is a cylinder 12 which is provided with a piston 13. The latter is mounted on a hollow shaft 14 which extends through the cylinder and which bears at one end a weight 15 having a groove 16. An auxiliary cylinder 17 is provided with a piston 18 mounted on a shaft 19. The latter is connected with a plunger 20 arranged to slide in a bore 21, in the casing 1, a stuffing box 22 being provided to prevent the escape of liquid from the bore 21.

At 23 I have shown a tank which is designed to be supplied with pressure, as for instance, compressed air. A pipe P extends from this tank to a valve V, this pipe P being provided with a suitable pressure regulator $p$. Communicating with the valve V is a pipe 24 having a check valve 25, a by-pass 26 being provided around the check valve. A pipe 27 also communicates with the valve V and is provided with a check valve 28. The pipe 27 has a by-pass 29 around the check valve.

Arranged to slide in a recess 30 in the casing 1, is a valve 31 having an opening 32 arranged to register with the bore 33 in the casing 1. The valve 31 is provided with a valve stem $32^x$ which is kept by a spring $33^x$ normally in position to bring the opening in the valve in registration with the casing, as shown in Fig. 1.

At W I have shown a receptacle for containing water or other suitable liquid. This receptacle is in communication with the pressure tank 23 by means of a pipe R which is provided with a suitable pressure regulator $r$. The tank W is in connection with a bore 34 in the casing 1 by means of a hose 35 or other suitable connection. A check valve 36 is provided for the purpose of retaining the liquid which is drawn into the bore 33.

From the foregoing description of the various parts of the device, the operation thereof may be readily understood.

Fig. 1 shows the gun just after it has been fired. Now when it is desired to reload the gun, the locking member 10 is released and the handle 8 is manipulated so as to swing the barrel 4 from the position shown in Fig. 1, to that shown in Fig. 2. This will shift the valve 31 into the position shown in Fig. 2, by the engagement of the finger $6^x$ with the end of the valve stem $32^x$, the spring $33^x$ being compressed. This closes the bore 33. The projectile 40 may now be placed in the inner end of the barrel where it is held in position by means of the spring stop member 41. The handle H of valve V is now turned into the position shown in Fig. 2, whereupon pressure from the tank 23 will pass through the pipes P, 24, and 26 into the interior of the cylinder 12 driving the piston 13 toward the rear and taking with it the shaft 14 and the weight 15. When the end of the shaft 14 engages the piston 18, the latter, together with the rod 19 and the plunger 20, are also moved rearwardly, and this causes a flow of the liquid from the tank W through the pipe 35 past the check valve 36 and into the bore 33. When now the barrel is thrown back into position by means of the handle 8 and locked, the spring 33 causes a movement of the valve 31 so as to bring it into the position shown in Fig. 1.

When it is desired to fire the gun, the handle H is moved into the position shown in Fig. 1, and then the pressure from the pipe 27 will enter the opposite end of cylinder 12 and move the piston 13 forwardly. This will cause the weight 15 to move forwardly, striking the plunger 20 thus forcing the liquid forwardly and propelling the projectile in front of it.

It will be noted that pressure from the tank 23 is always behind the piston 18. The large area of the piston 13, however, will cause the movement of the piston 18 rearwardly in loading the gun or in drawing in the liquid preparatory to firing the same.

The use of a liquid leads to two important results. One is that quicker action may be had than when air alone is used, owing to the fact of the incompressibility of the liquid. The latter, however, acts as a cooling medium and insures a cool operation.

I claim:—

1. In a pneumatic-hydraulic gun, a casing, a barrel hingedly connected to said casing, a plunger disposed within the casing, pneumatic means for operating said plunger, a source of liquid supply, connections between said source of liquid supply and the plunger bore for drawing the liquid into the bore on the retraction of the plunger.

2. In a pneumatic-hydraulic gun, a casing, a barrel hingedly connected to said casing, a plunger disposed within the casing, pneumatic means for operating said plunger, a source of liquid supply, connections between said source of liquid supply and the plunger bore for drawing the liquid into the bore on the retraction of the plunger, and means for retaining the liquid within the plunger bore when the barrel is unbreeched.

3. In a pneumatic-hydraulic gun, a casing, a barrel hingedly connected to said casing, a plunger disposed within the casing, pneumatic means for operating said plunger, a source of liquid supply, connections between said source of liquid supply and the plunger bore for drawing the liquid into the bore on the retraction of the plunger, and means for automatically retaining the liquid within the plunger bore when the barrel is unbreeched.

4. In a pneumatic-hydraulic gun, a casing, a barrel hingedly connected to said casing, a plunger disposed within the casing, pneumatic means for operating said plunger, a source of liquid supply, connections between said source of liquid supply and the plunger bore for drawing the liquid into the bore on the retraction of the plunger, and means for automatically retaining the liquid within the plunger bore when the barrel is unbreeched, said means comprising a valve, and means connected with the barrel of the gun for operating the valve when the barrel is unbreeched.

5. In a pneumatic-hydraulic gun, a casing provided with a bore, a plunger arranged to reciprocate in said bore, a cylinder disposed within the casing, a piston within the cylinder, a plunger rod, means for moving the plunger rod through the movement of said piston, means for admitting fluid pressure into said cylinder on either side of said piston, a weight connected with said piston and movable relatively to said plunger, and arranged to engage the plunger in its movement.

6. In a pneumatic-hydraulic gun, a casing provided with a bore, a plunger arranged to reciprocate in said bore, a cylinder disposed within the casing, a piston within the cylinder, a plunger rod, means for moving the plunger rod through the movement of said piston, means for admitting fluid pressure into said cylinder on either side of said piston, a weight connected with said piston and movable relatively to said plunger and arranged to engage the plunger in its movements, and an auxiliary cylinder having a piston rigidly connected to said plunger, said auxiliary cylinder being constantly under fluid pressure.

7. In a pneumatic-hydraulic gun, a casing provided with a bore, a plunger arranged to reciprocate in said bore, a cylinder disposed within the casing, a piston within the cylinder, a plunger rod, means for moving the plunger rod through the movement of said piston, means for admitting fluid pressure into said cylinder on either side of said piston, a weight connected with said piston and movable relatively to said plunger and arranged to engage the plunger in its movement, a barrel hingedly connected to said casing and provided with a bore, and a valve for cutting off communication between the plunger bore and the barrel bore.

8. In a pneumatic-hydraulic gun, a casing provided with a bore, a plunger disposed within said bore, a barrel having a bore arranged to register with the first named bore, and automatic means for cutting off communication between said bores when the barrel is unbreeched.

9. In a pneumatic-hydraulic gun, a casing provided with a bore, a plunger disposed within said bore, a barrel having bore arranged to register with the first named bore, an arm carried by said casing, an arm carried by said barrel, a handle carried by said last named arm, a locking segment carried by said first-named arm, a pivotal connection between said arms, and means for locking the barrel to the casing.

10. In a pneumatic-hydraulic gun, a casing, a barrel hingedly connected thereto, an arm having an extension carried by said barrel, said casing having a plunger bore and said barrel having a projectile bore arranged to register with said plunger bore, a slidable valve for cutting off communication between said plunger bore and said projectile bore, and a spring pressed valve stem arranged to be engaged by said extension and to be moved transversely of said bores.

ROLLIE CALVIN HILL.